No. 672,846. Patented Apr. 23, 1901.
A. W. BODELL.
WATER FILTER.
(Application filed June 11, 1900.)
(No Model.)
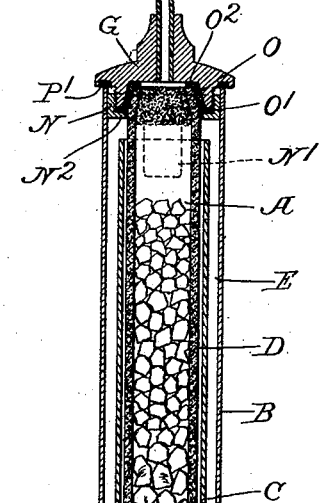
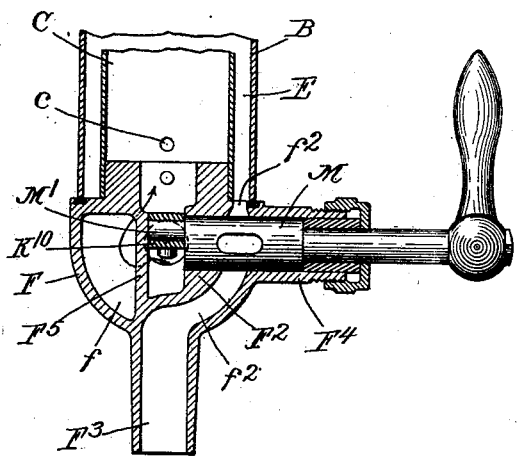
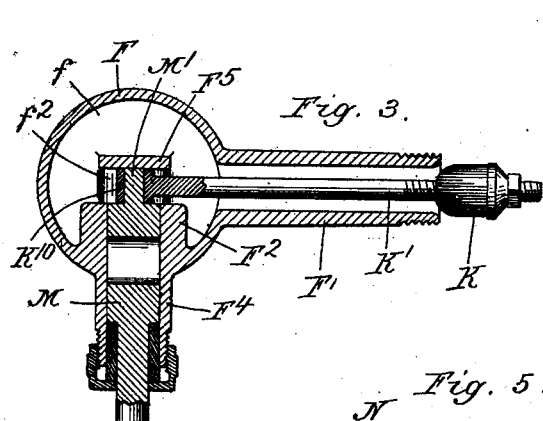
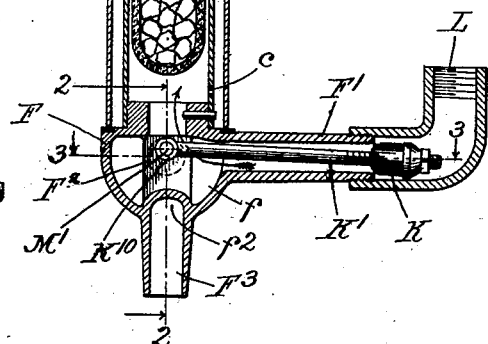
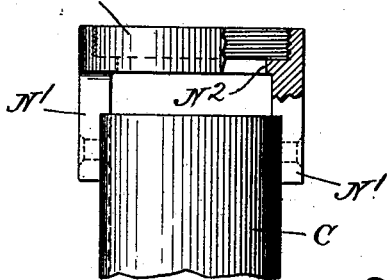
Witnesses.
Edward T. Wray.
Edgar L. Conant
Inventor.
Allen W. Bodell
by Benton Benton
his Atty's

UNITED STATES PATENT OFFICE.

ALLEN W. BODELL, OF CHICAGO, ILLINOIS.

WATER-FILTER.

SPECIFICATION forming part of Letters Patent No. 672,846, dated April 23, 1901.

Application filed June 11, 1900. Serial No. 19,872. (No model.)

*To all whom it may concern:*

Be it known that I, ALLEN W. BODELL, a citizen of the United States, residing at Chicago, county of Cook, State of Illinois, have invented certain new and useful Improvements in Water-Filters, which are fully set forth in the following specification, reference being had to the accompanying drawings, forming a part thereof.

In the drawings, Figure 1 is a vertical section of my filter and its connections. Fig. 2 is a detail section at the line 2 2 on Fig. 1. Fig. 3 is a horizontal section at the line 3 3 on Fig. 1. Fig. 4 is a detail elevation of the upper end of the filtering-cup element. Fig. 5 is a detail side elevation of a fitting on the upper end portion of a cylindrical partition between the porous filtering element and the outer shell, said fitting being partly broken away and shown in radial section. Figs. 2, 3, 4, and 5 are on a larger scale than Fig. 1.

My improved filter comprises a porous cup A, cylindrical in form, with a hemispherical bottom and open at the top and a cylindrical partition C, encompassing the cup and encompassed by the shell, leaving a very thin annular chamber or passage D between the outer surface of the cup and the inner surface of the partition and a larger annular passage E between the partition and the outer shell. Both the outer shell B and the partition C are stepped and united water-tight at their lower end on the base F. A cap G closes the filter at the upper end, the same being lodged water-tight on the upper end of the cup and on the upper end of the outer shell and spanning but not making junction with the upper end of the partition. From the center of the cap a gooseneck discharge-pipe H emerges, leading and constituting the discharge from the cavity of the cup. The base F has a tubular spud F', whose cavity communicates with the chamber $f$ of the base and constitutes the inlet thereto, being closed or controlled by the valve K, lodged in the fitting L, by which connection is made with the water-supply, and seating on the outer end of the spud. In a vertical plane through the axis of the filter at right angles to the spud a boss $F^2$ is formed on the inner side of the base, having a duct $f^2$, leading downward to a discharge-nozzle $F^3$ at the center of the abutment and terminating upward at the surface of the base between the outer shell B and the partition C, and in the same vertical plane with said boss, at right angles to the spud F', I form an exterior boss $F^4$, which is bored horizontally across the duct $f^2$ to admit the turn-cock M, which when inserted extends across the duct $f^2$ and is adapted to control it. On the inner end of the turn-cock M is a crank-pin M', which engages the end of the rod or stem K' of the valve K, said rod having an eye $K^{10}$ on its inner end to effect such engagement. Preferably both to check the turn-cock endwise and also to insure the retention of the eye $K^{10}$ on the crank-pin I form in the base the vertical web or bridge $F^5$ opposite the end of the bore in the boss $F^4$. The port through the cock is in a direction at right angles to the radial plane in which the crank-pin is located. When the port is vertical and the crank-pin at the side toward the valve, the supply is admitted and passes up through the chamber D, over the partition C, down through the chamber E, and out through the passage $f^2$ and drain-nozzle $F^3$. When the port is vertical and the wrist-pin is at the side remote from the valve, the supply is cut off; but the drain being open the fixture will be emptied, the water passing out of the porous cup through its walls and by the port c into the chamber E, and thence out through duct $f^2$. When the port of the cock stands horizontal and the crank-pin either above or below, the supply is open and the drain closed and water will be discharged from the filter-cup through the gooseneck. When the crank-pin stands forty-five degrees above or below horizontal position at the side remote from the valve, the supply is cut off and the drain is closed and water will not flow into nor out of the fixture.

It will be noticed that the porous cup D is suspended overhanging the inner chamber at the bottom, having no support at the lower end. For the purpose of suspending it and at the same time avoiding the difficulty which would arise if the fragile porcelain were grasped or bound rigidly by the metal, thereby creating a liability to break the porcelain at the point of fastening or suspension, I provide a rubber sleeve or collar O, which requires to be somewhat stretched in order to be passed onto the upper end of the cup outside the same, and this sleeve or collar is formed with a flange O', which when the sleeve is in place on the upper end of the cup projects transversely to the axis of the latter and forms an elastic shoulder by which the cup is suspended. Preferably the cup is slightly beveled at the upper end exteriorly. The sleeve accommodating itself to this bevel when it is stretched onto the cup may also have an inwardly-turned flange O² at the upper end, which will extend onto the upper end of the cup, making the sleeve or collar in radial section Z-shaped, as seen in Fig. 1.

For the purpose of securing the several parts of the device together by means of the cap G at the upper end I secure to the upper end of the partition C' a ring N by means of downwardly-projecting lugs N' N'. In this ring I provide an upwardly-facing shoulder N², on which the flange O' of the sleeve O lodges when the cup, with the sleeve thereon, is passed downwardly into place within the cylindrical partition C. The ring above this seat is interiorly threaded, and the cap has a central annular boss exteriorly threaded adapted to pass down outside the sleeve O, and when it is screwed into the ring adapted to bind the sleeve opposite the tapering upper end of the cup and on the inwardly-projecting flange O². The sleeve thus serves not only to suspend the cup, but as a packing to close the junction of the cup with the cap and with the outer shell. A packing-gasket P' is also interposed between the upper end of the outer shell B and the marginal flange of the cap, thus completing the necessary water-tight junctions.

It will be noticed that the partition C constitutes the means of binding the base and cap together, so that the outer shell is bound between them, and that the ring, attached to the upper end of the partition by its lugs, so as to leave space between the upper margin of the partition and the ring, makes it possible to thus utilize the partition for the purpose of connecting cap and base, while leaving free communication between the chambers D and E over the upper margin of the partition, and also that this ring both supports the porous cap suspended over the base and constitutes one of the elements between which it is clamped in order to make water-tight junction at the top with the cap.

The fragile character of the material of which such porous cups are made renders it difficult to secure them by clamping without breaking the edge, especially in view of the fact that they have to be frequently removed for "baking" or other treatment to destroy germs which may become deposited in their pores. To remedy this defect, I find it serviceable to apply one or more coats of shellac $a$ to the margin of the cup, both inside and out, for a short distance. This forms a tough skin, which prevents the material from becoming cracked by the clamping. For further security I employ the Z-shaped rubber packing O, seating not only on the upper edge of the cup, but also on the slightly-sloping margin, and having the shoulder formed by the flange O', by which the cup is suspended in the ring N, and I make the cap G with the annular boss or flange, suitably shaped to seat and bind on all three surfaces of the Z-shaped packing when it is screwed home into the ring.

While the filtering is perfectly performed by the porous cup so far as relates to the extraction of impurities other than those in solution or gases which are held by absorption in the water, it is desirable to supplement this action by means which may be adapted to remove other impurities not susceptible of removal by filtration proper. For this purpose the cavity of the cup may be charged with any suitable material adapted to act upon the water to counteract or extract impurities in solution. A common illustration of such action is that produced by pulverized or comminuted charcoal, which, while suitable to act as a mere filtrant to arrest solid impurities, is also calculated to remove gaseous impurities by absorption and to hold any chemical which may be found desirable to counteract the effect of other impurities in the water remaining after mechanical filtration.

I claim—

1. In a filter, a drain-cock having two open positions, a supply-valve connected to the drain-cock and operated thereby, one open position of the cock causing closed position of the supply-valve and the other open position of the cock causing open position of the valve.

2. In a filter, a drain-cock having a range of movement in closed position, the supply-valve connected to and operated by the drain-cock and moved from open to closed position by the movement of the drain-cock within the range of the closed position of the cock.

3. In a filter comprising an interior porous cup into which the water passes by filtration through its walls, an outer chamber having a draw-off or drain cock at the bottom, an intermediate partition dividing such chamber into two, and affording free communication between the two at the top only, such partition having a small aperture at the bottom part to permit slow drainage from the inner to the outer chamber; whereby the porous cup is emptied by refiltration when the supply is closed and the drain is open.

4. In a filter, an interior porous cup having a top discharge and a partition encompassing the cup, and an outer shell encompassing the partition; a base joined water-tight to the partition and the shell and spanning the bottom of the cup; a cap joined water-tight to the top of the cup and of the outer shell, and spanning the partition; an inlet at the base, and a duct in the base leading from the chamber between the outer shell and the partition, and valves which control the inlet and said duct, whereby the supply-water may be drawn without passing it through the filtering-cup, and in its passage scours the outer side of the cup in an upward movement over it.

5. In combination with the base, the partition C secured at the lower end to the base; the ring having lugs by which it is secured to the upper end of the partition and upheld therefrom; the porous cup suspended in the ring; the outer shell stepped in the base, and the cap screwed into the ring and binding the upper edge of the cup and of the outer shell.

6. In a filter, a porous cup having its margin protected by a skin of shellac and the cap bound water-tight onto the cup at such protected margin.

In testimony whereof I have hereunto set my hand, at Chicago, Illinois, in the presence of two witnesses, this 31st day of May, A. D. 1900.

ALLEN W. BODELL.

In presence of—
CHAS. S. BURTON,
EDGAR L. CONANT.